Aug. 18, 1931.   A. W. RYBECK   1,819,267
FLUID MEASURING DEVICE
Filed Jan. 18, 1929
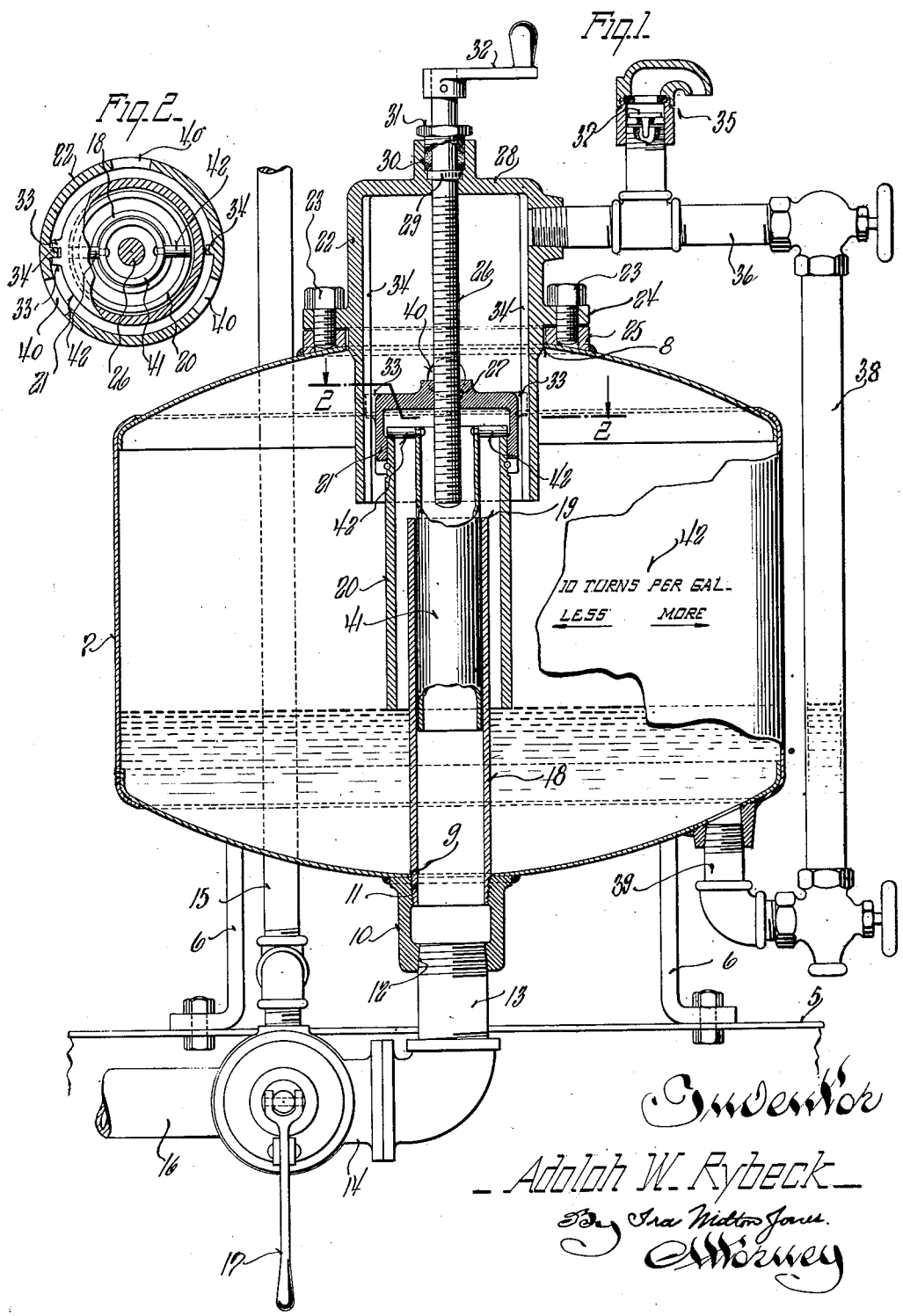
Inventor
Adolph W. Rybeck
By Ira Milton Jones
Attorney Patented Aug. 18, 1931

1,819,267

UNITED STATES PATENT OFFICE

ADOLPH WILLIAM RYBECK, OF MILWAUKEE, WISCONSIN, ASSIGNOR TO THE T. L. SMITH COMPANY, OF MILWAUKEE, WISCONSIN, A CORPORATION OF WISCONSIN

FLUID MEASURING DEVICE

Application filed January 18, 1929. Serial No. 333,421.

This invention relates to certain new and useful improvements in fluid measuring devices and refers more particularly to water measuring tanks of cement mixers and the like as illustrated in my co-pending application, Serial No. 265,301.

Fluid measuring devices of this type, heretofore in use, have been objectionable due to their inaccuracy under certain conditions and especially when the machine with which they were used stood out of plumb. It is, therefore, an object of this invention to provide an improved fluid measuring device of the character described which is extremely accurate and which is substantially unaffected by any usual degree of tilting of the machine with which it is used.

Another object of this invention resides in the provision of a fluid measuring device of the character described which discharges its contents by siphonage and thus insures a positive interruption of the flow at the proper instant.

A further object of this invention resides in the provision of a fluid measuring device which may be readily adjusted to discharge a predetermined quantity of fluid, when its discharge valve is opened, and in which the adjustment remains undisturbed during refilling of its container.

And a still further object of this invention resides in the provision of an improved construction for fluid measuring devices of the character described which is extremely simple and rugged, having but a few parts which are not likely to get out of order.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a view, partly in longitudinal section and partly in elevation, illustrating my improved fluid measuring device, and Figure 2 is a cross sectional view taken through Figure 1 on the plane of the line 2—2.

Referring now more particularly to the accompanying drawings, numeral 5 represents a portion of the frame of a cement mixer or the like from which supports 6 extend to carry the container 7 of my improved measuring device. The container 7 is substantially drum shape and has its upper and lower ends provided with apertures 8 and 9, respectively.

Welded, or otherwise secured to the bottom of the container and adjacent an opening 9 therein, is a tubular casting 10 having a threaded opening 11 at its upper end, forming a continuation of the aperture 9, and a second threaded opening 12 at its lower end in axial alignment therewith. A pipe 13 is threaded in the opening 12 and communicates with a three-way valve 14, of conventional construction, with which a supply pipe 15 and an outlet pipe 16 connect. A handle 17 carried by the valve provides means for shifting its plunger, not shown, so that the pipe 13 may be either connected with the supply pipe 15, or outlet pipe 16.

Secured in the threaded opening 11 of the tubular member 10 is an upstanding discharge tube 18 which forms substantially a continuation of the pipe 13, and whose upper open end 19 terminates at a point adjacent the upper portion of the container 7. A sleeve member 20 carried by a cap 21 which closes its upper end, is engaged over, but spaced from the discharge tube 18, for a purpose to be later described. The cap 21 and consequently the sleeve 20 are slidably mounted in a hood or dome 22, which is extended through the opening 8 in the top of the container 7, where it is secured by bolts 23 or the like, passing through an annular flange 24 formed on the hood, and threaded in a collar 25 welded or otherwise secured to the top of the container adjacent the opening 8.

The position of the lower open end of the sleeve 20 governs the quantity of fluid to be discharged, in a manner to be later described, and therefore, the position of the sleeve is readily adjustable. Movement of the sleeve to adjust its height is affected by a screw shaft 26 threaded in an aperature 27 formed in the top of the cap 21, and rotatably but non-longitudinally mounted in the upper closed end 28 of the hood 22. A collar 29 carried by the screw shaft is received in the lower end of a counter-bore 30 of the end 28 of the hood, and through which the shaft extends, and a packing nut 31 threaded in the outer end of the counter-bore secures the collar and shaft against longitudinal movement, and provides a fluid tight seal between the shaft and the top wall 28. A handle 32 is secured to the upper end of the screw shaft to facilitate turning thereof.

The cap 21 is restrained against turning with the shaft 26 to cause its up or down movement depending upon the rotation of the shaft, by pairs of diametrically spaced ears or lugs 33 projected from the cap members, and between which longitudinal ribs 34, extended from the inner wall of the hood 22, are slidably received.

When it is desired to fill the container 7 with fluid, the handle 17 of the three-way valve 14 is actuated to connect the supply pipe 15 with the pipe 13 and consequently the tube 18, which permits the water to flow from a source of supply, not shown, into the container. An air relief valve 35, communicating with the interior of the hood 22 through a pipe connection 36, permits the entire interior of the container 7 and the hood 22 to fill with fluid, as its plunger 37 remains in open position as long as air is being expelled through the valve but moves to its closed position as soon as fluid attempts to pass therethrough. The height of the fluid within the container is readily determined by a water gauge 38 connected at its upper end with the pipe 36 and at its lower end with the tubular casting 10, by a pipe 39.

To prevent the accumulation of air under the top of the container around the downwardly projecting portion of the hood 22, openings 40 are formed in the hood adjacent the top of the container.

Another point at which there is a tendency to create an air pocket, is between the upper end 19 of the tube 18 and the cap 21, especially when the sleeve 22 is in its uppermost position. To prevent this accumulation of air, a sleeve 41 is freely slidably mounted within the tube 18 and has its upper open end disposed adjacent the top of the cap 21, where it is supported by pins 42, welded or otherwise secured to the sleeve, and whose outer ends rest upon the adjacent upper end of the sleeve 20. Thus it will be seen that the sleeve 41 moves within the sleeve 20 and causes the fluid entering, or being discharged through the tube 18, to at all times, pass all the way up to the cap 21 and thus prevent the accumulation of air at this point.

In use, when the operator desires to discharge a certain volume of fluid, he adjusts the sleeve 20 by turning the handle 32 in the proper direction, a predetermined number of revolutions, the number of turns per gallon being preferably posted on the container, as at 42, and actuates the handle 17 to connect the tube 18 with the outlet pipe 16, which permits the fluid within the container to pass outwardly therethrough. Inasmuch as the tube 18 and the sleeve 20 constitute a siphonal structure, the fluid will discharge until its level reaches the open end of the sleeve 20, at which point the air seal is broken. To again discharge the same volume of fluid it is only necessary to refill the container.

From the foregoing description, taken in connection with the accompanying drawing, it will be readily apparent to those skilled in the art to which an invention of the character described appertains, that I provide an improved construction for fluid measuring devices, the accuracy of which is not affected by any usual degree of tilting, as the lower open end of the sleeve 20 which governs the interruption of the discharge has a comparatively small diameter and as the discharge is affected by siphonage the "cut off" is positive.

What I claim as my invention is:

1. In a liquid measuring device including a container, a tubular discharge member extended into the container, a second tubular member in telescoped relation to the discharge member, the walls of the tubular members being spaced from each other to provide a passage for liquid, the length of which governs the quantity of fluid to be discharged, and means for moving one of the members with respect to the other to adjust the length of said passage and regulate the quantity of liquid to be discharged from the container.

2. In a fluid measuring device including a container adapted to be filled with fluid, a discharge member extended upwardly into the container, and a member cooperating with the discharge member to form a siphon structure for regulating the quantity of fluid to be discharged, and whereby the fluid is discharged by siphonage.

3. In a fluid measuring device including a container adapted to be filled with fluid, a discharge member extended upwardly into the container, and a sleeve member closed at one end and engageable over the discharge member but spaced therefrom, whereby communication between the discharge member and the container interior is through the sleeve member, and whereby fluid may be discharged through the discharge member by siphonage, the position of the lower end of the sleeve member governing the quantity of fluid which is discharged.

4. In a fluid measuring device including a container adapted to be filled with fluid, a discharge member extended upwardly into the container, a sleeve member having its upper end closed engaged over the discharge member but spaced therefrom, whereby fluid to be discharged must first pass through the sleeve member before it can enter the discharge member, thus producing a siphonage which continues until the fluid level within the container reaches the lower open end of the sleeve member, and means for adjusting the position of the sleeve member to govern the quantity of water to be discharged.

5. In a fluid measuring device including a container adapted to be filled with fluid, a tubular member extending upwardly into the container and through which the container is filled and discharged, a second tubular member having its upper end closed cooperating with the first mentioned tubular member to form a siphon through which the fluid is discharged by siphonage, and means for adjusting the second tubular member to govern the volume of fluid to be discharged.

6. In a fluid measuring device including a container adapted to be filled with fluid, a tubular member extending into the interior of the container and having its inner end open and disposed adjacent the upper portion of the container and through which the fluid within the container is discharged, and means whereby the fluid may be discharged to a level below the inner end of the tubular member.

7. In a fluid measuring device having a container adapted to be filled with fluid, a tubular member extending upwardly into the interior of the container and providing an opening through which the container is filled and discharged, the upper end thereof terminating adjacent the upper portion of the container, a sleeve having its upper end closed and disposed over the open end of said tubular member but spaced therefrom to permit communication between the interior of the container and the tubular member, and means for readily adjusting the position of the sleeve with respect to the tubular member whereby the quantity of fluid to be discharged from the container may be governed.

8. In a liquid measuring device including a container, a plurality of tubular telescoped members extended into the container and arranged to form a siphon structure, means whereby the container may be filled and discharged through said siphon structure, and means for adjusting one member relative to another to regulate the quantity of liquid to be discharged from the container.

9. In a fluid measuring device including a container adapted to be filled with fluid, a pair of tubular telescoped members extended into the container and arranged to form a siphon structure, means whereby the container may be filled and discharged through said siphon structure, and means for adjusting one member with respect to the other to regulate the quantity of fluid to be discharged from the container.

10. In a fluid measuring device of the character described, including a container adapted to be filled with fluid, a pair of tubular telescoped members having a space between their adjacent walls and arranged to form a siphon, one of said members being fixed within the container and the other being movable, means for filling the container and the tubular members with fluid, means whereby the fluid may be discharged from the container through the siphon provided by the two tubular members, and means for adjusting the movable member to regulate the quantity of fluid to be discharged.

11. In a fluid measuring device including a container adapted to be filled with fluid, an open ended tubular discharge member extending upwardly into the container and through which the container is filled and discharged, a second tubular member telescoped over the first mentioned tubular member and having its upper end closed and its inner wall spaced from the outer wall of the first mentioned tubular member to cooperate therewith and form a siphon structure through which the fluid may be discharged from the container, means for guiding the second mentioned tubular member for vertical movement, and means for moving the second mentioned tubular member to adjust the same vertically and regulate the quantity of fluid to be discharged from the container.

12. In a fluid measuring device of the character described and including a container adapted to be filled with fluid, a stationary tubular member extended upwardly into the container and through which the container is filled and discharged, a second tubular member telescoped over the first mentioned tubular member and having its inner wall spaced over the outer wall of the first mentioned tubular member and its upper end closed so that the two tubular members form a siphon structure for discharging the contents of the container, a hood carried by the upper portion of the container, cooperating means carried by the second mentioned tubular member and the hood for guiding the second mentioned tubular member for vertical movement, and screw means for adjusting the position of the second mentioned tubular member to regulate the quantity of fluid to be discharged from the container.

13. In a fluid measuring device of the character described including a container adapted to be filled with fluid, a pair of tubular telescoped members extended into the container, one of said members being fixed and having its upper end open and the other member being movable and having its upper end closed so that its closed upper end is movable toward and away from the open end of the first mentioned member, said members together comprising a siphon structure through which fluid in the container is discharged and means for preventing the formation of an air pocket between the closed upper end of the movable member and the adjacent open end of the first mentioned tubular member.

14. In a fluid measuring device including a container adapted to be filled with fluid, a pair of tubular telescoped members within the container, one of said members being stationary and having its upper end open and the other being movable and having its upper end closed so that the members cooperate to form a siphon structure for discharging fluid within the container, and a sleeve member carried by the movable tubular member for preventing the formation of an air pocket beneath its closed upper end.

In testimony whereof I have hereunto affixed my signature.

ADOLPH WM. RYBECK.